(12) United States Patent
Mori et al.

(10) Patent No.: US 6,269,111 B1
(45) Date of Patent: Jul. 31, 2001

(54) COMPACT LASER OSCILLATOR

(75) Inventors: Atsushi Mori; Yoshinori Nakata, both of Oshino-mura (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 08/589,331

(22) Filed: Jan. 22, 1996

Related U.S. Application Data

(63) Continuation of application No. 08/137,033, filed on Oct. 18, 1993, now abandoned.

(30) Foreign Application Priority Data

Feb. 19, 1992 (JP) .................................................... 4-069804
Feb. 5, 1993 (WO) .................................... PCT/JP93/00150

(51) Int. Cl.[7] .................................................... H01S 3/08
(52) U.S. Cl. .............................. 372/92; 372/99; 372/108
(58) Field of Search ....................... 372/93, 108; 359/529

(56) References Cited

U.S. PATENT DOCUMENTS

| | | | | |
|---|---|---|---|---|
| 3,448,404 | * | 6/1969 | McFarlane | 372/108 |
| 3,624,551 | * | 11/1971 | Gudmuudsen | 372/108 |
| 3,683,297 | * | 8/1972 | Hobart et al. | 372/93 |
| 4,641,312 | * | 2/1987 | Schäffer et al. | 372/93 |
| 4,757,511 | * | 7/1988 | Klingel et al. | 372/93 |
| 5,023,886 | * | 6/1991 | Hobart et al. | 372/93 |
| 5,052,017 | * | 9/1991 | Hobart et al. | 372/108 |

FOREIGN PATENT DOCUMENTS

| | | |
|---|---|---|
| 2252630 | 5/1974 | (DE) . |
| 3412398 | 10/1985 | (DE) . |
| 0358769 | 3/1990 | (EP) . |
| 0371781 | 6/1990 | (EP) . |
| 49-64393 | 6/1974 | (JP) . |
| 52-39393 | 3/1977 | (JP) . |
| 63-91618 | 4/1988 | (JP) . |
| 4-83385 | 3/1992 | (JP) . |

* cited by examiner

*Primary Examiner*—Teresa M. Arroyo
*Assistant Examiner*—Gioacchino Inzirillo
(74) *Attorney, Agent, or Firm*—Staas & Halsey LLP

(57) ABSTRACT

A laser oscillator which allows the length of a light guide path between itself and a laser beam machine to be reduced. This laser oscillator comprises a laser resonator and a reflector for reflecting and turning back a laser beam emitted from the laser resonator. The laser beam emitted from an output mirror of the laser resonator is outputted from the laser oscillator after being turned back by the reflector and traveling for a predetermined optical path length. In some cases, the direction of the laser beam outputted from the laser oscillator is opposite to the direction of the laser beam emitted from the output mirror. One of the additional reflectors may be a phase lag reflector, and the laser beam can be converted into a circular polarized beam in the laser oscillator.

11 Claims, 8 Drawing Sheets

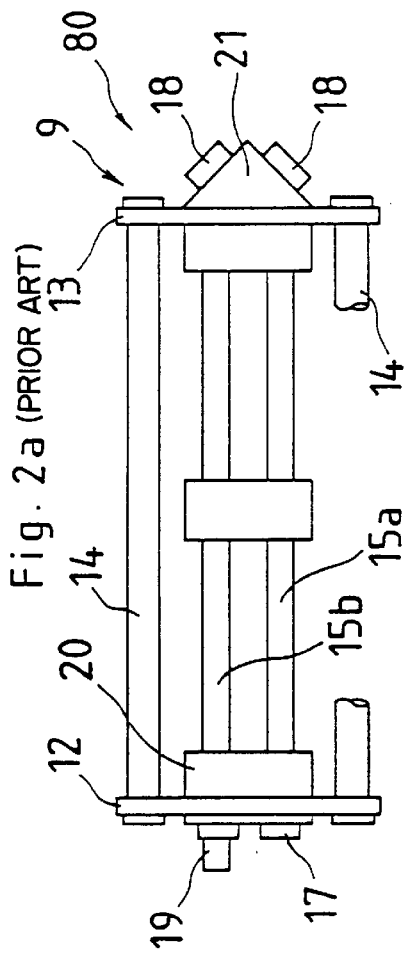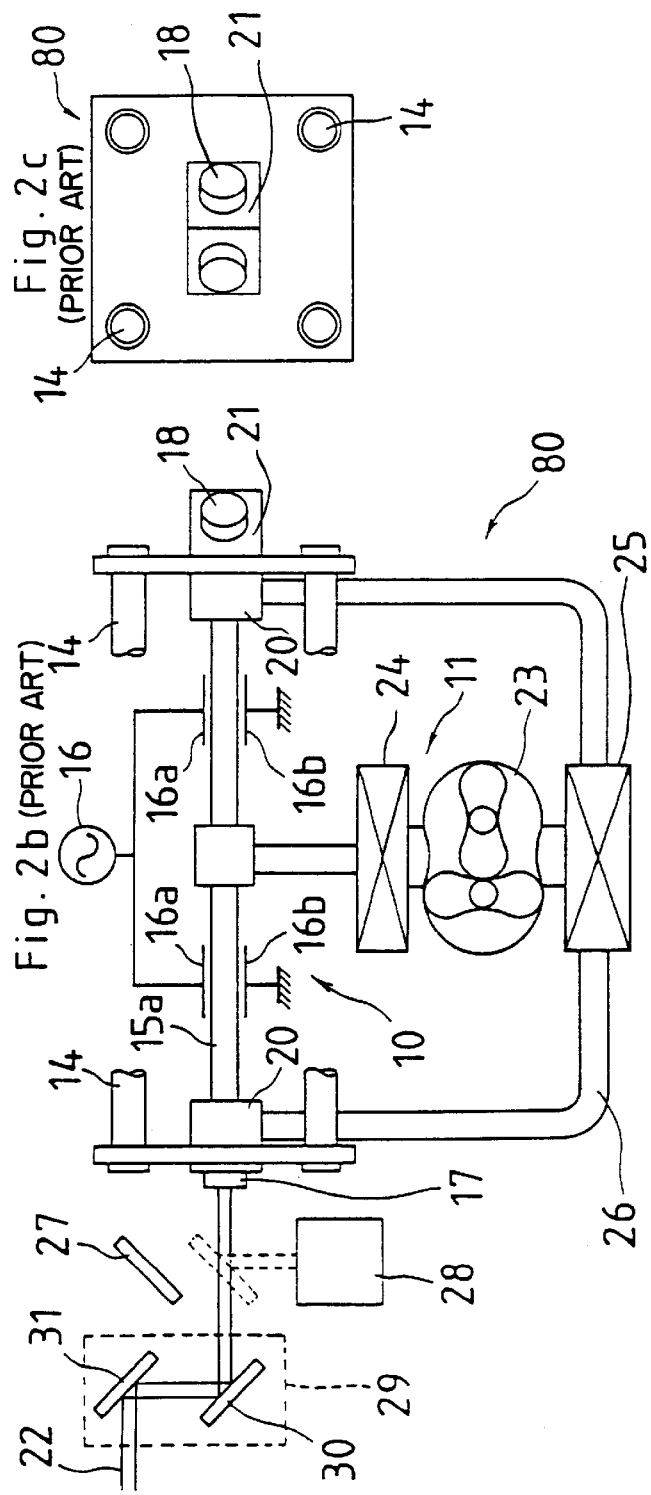

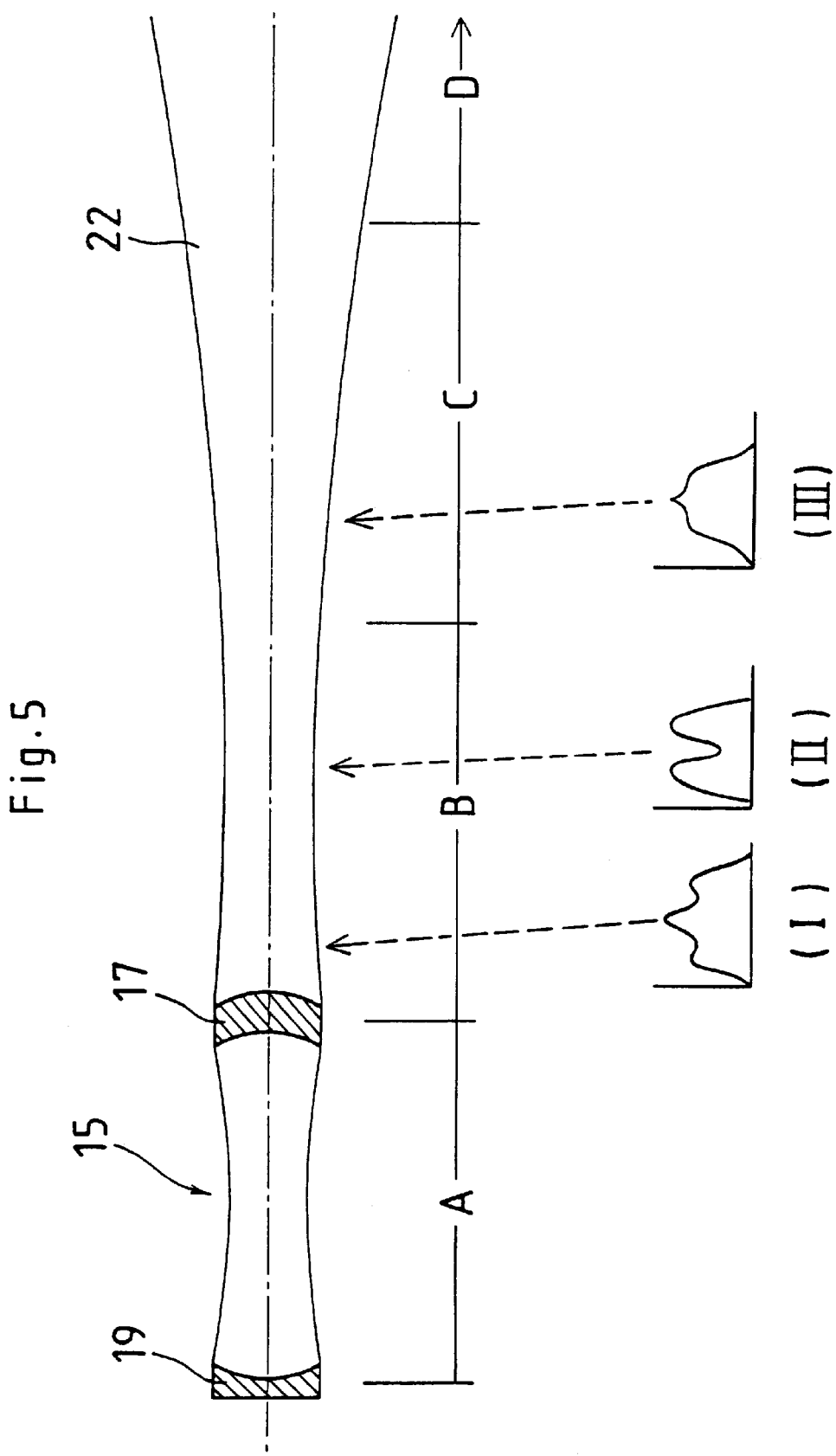

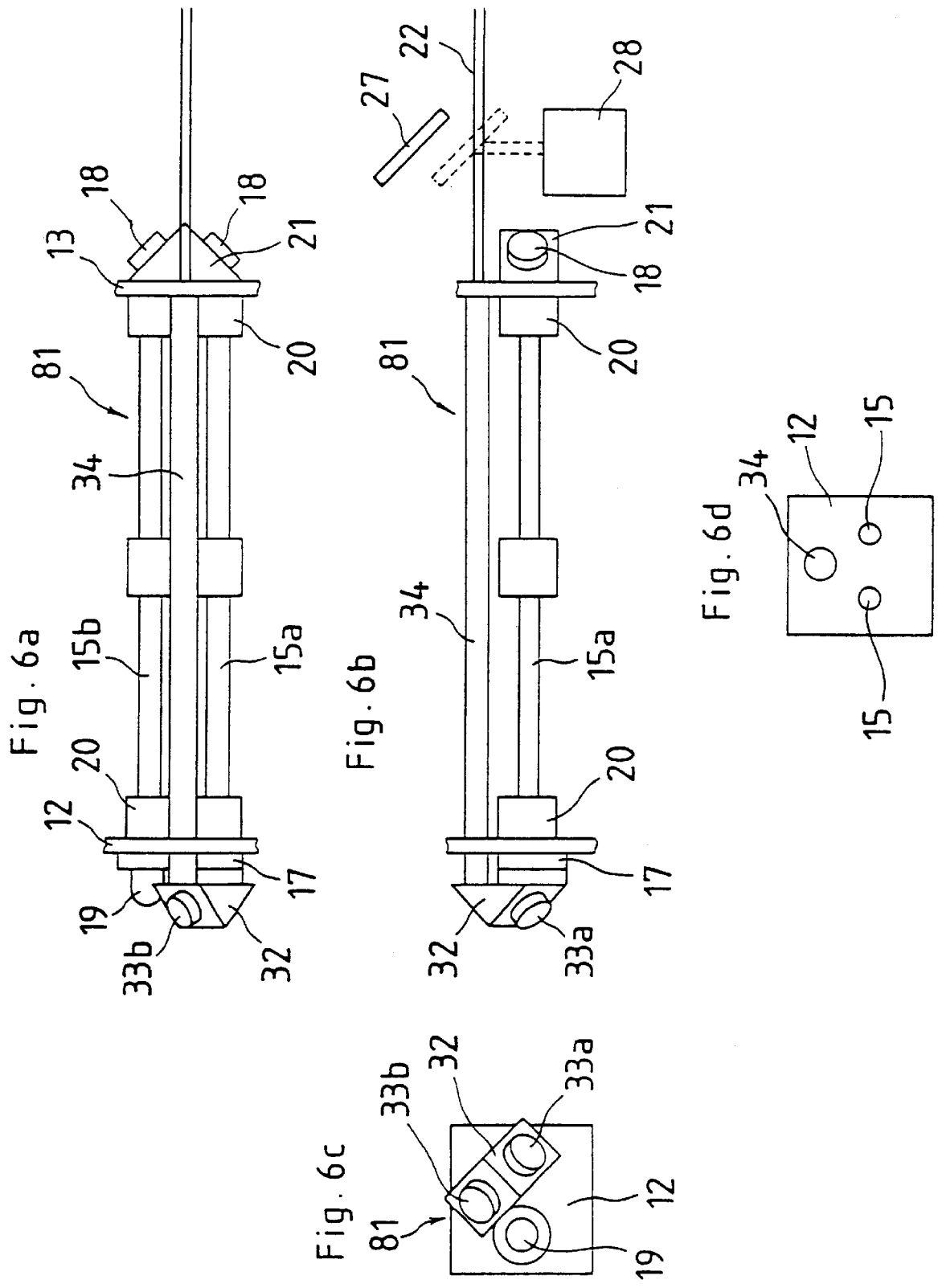

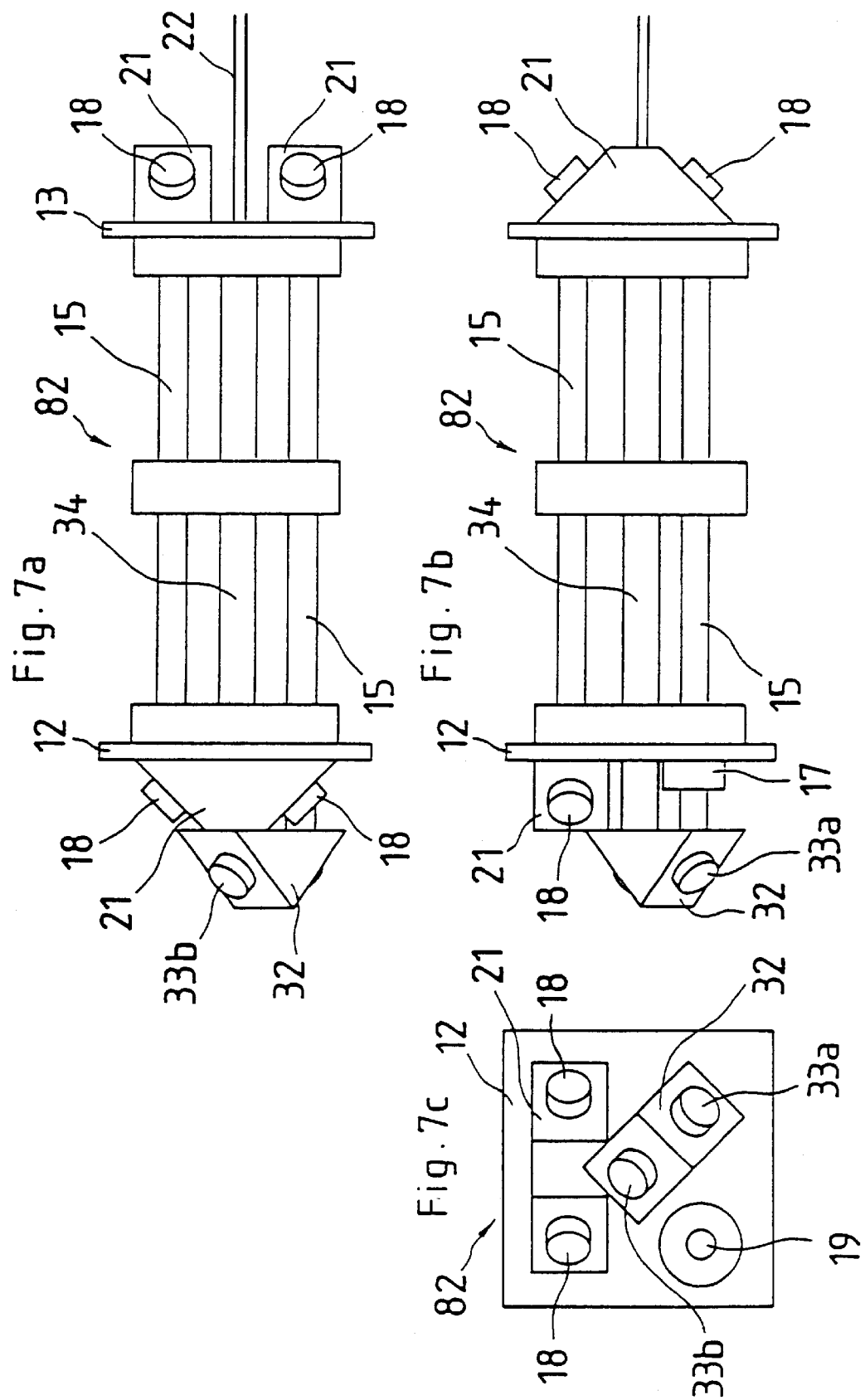

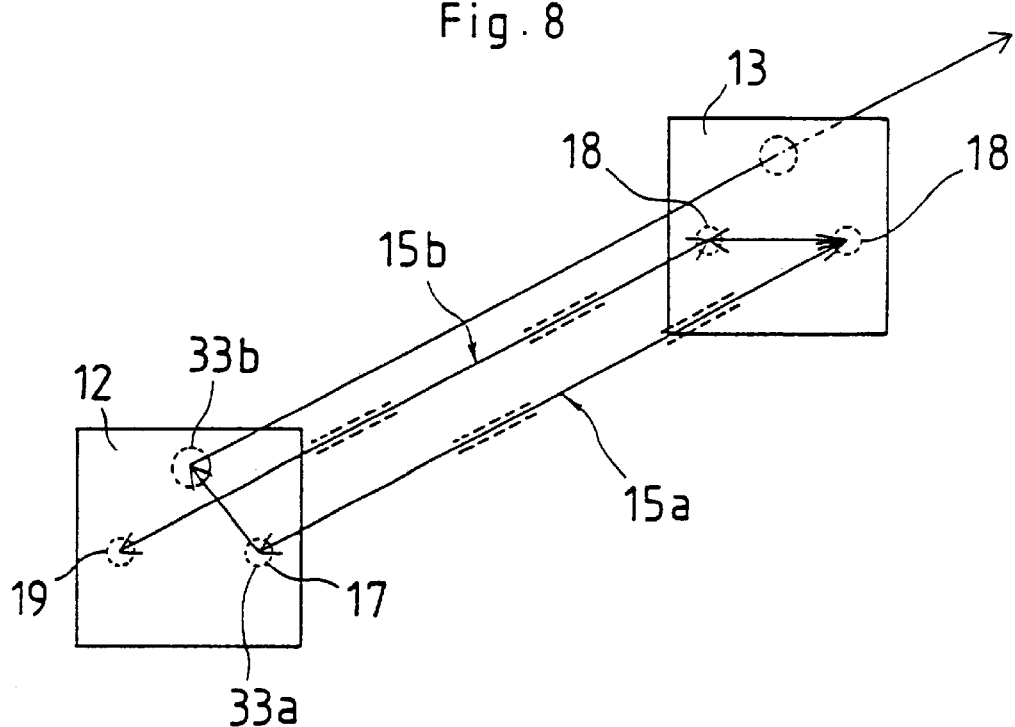
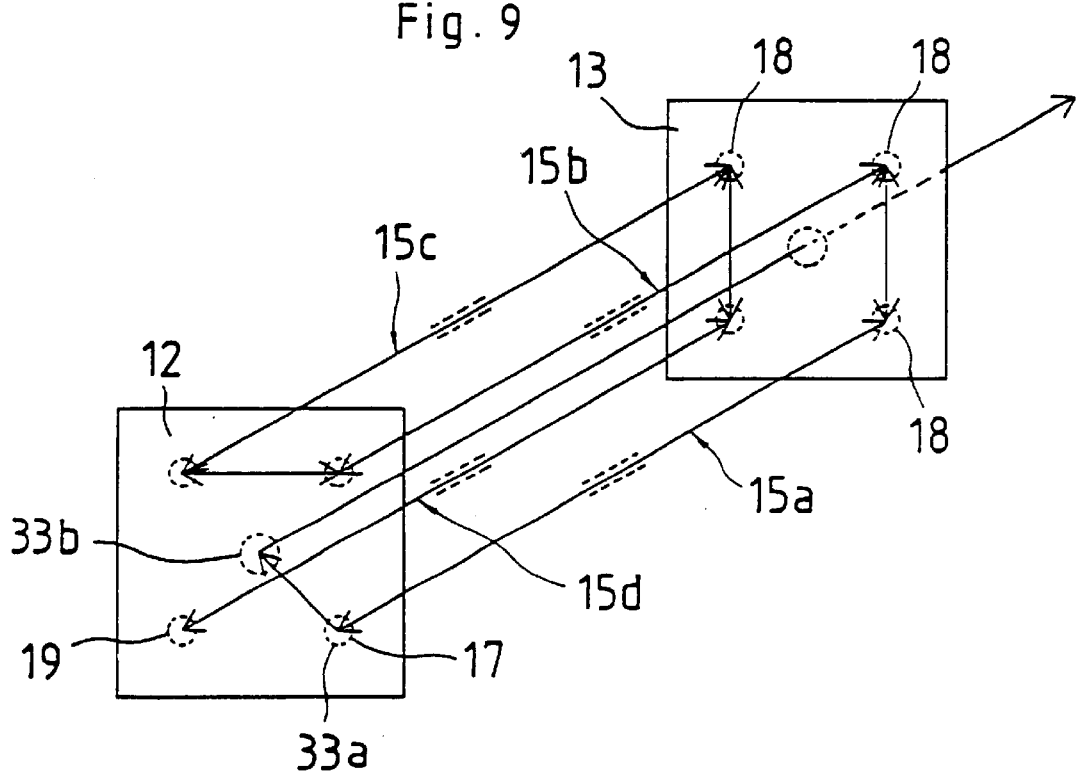

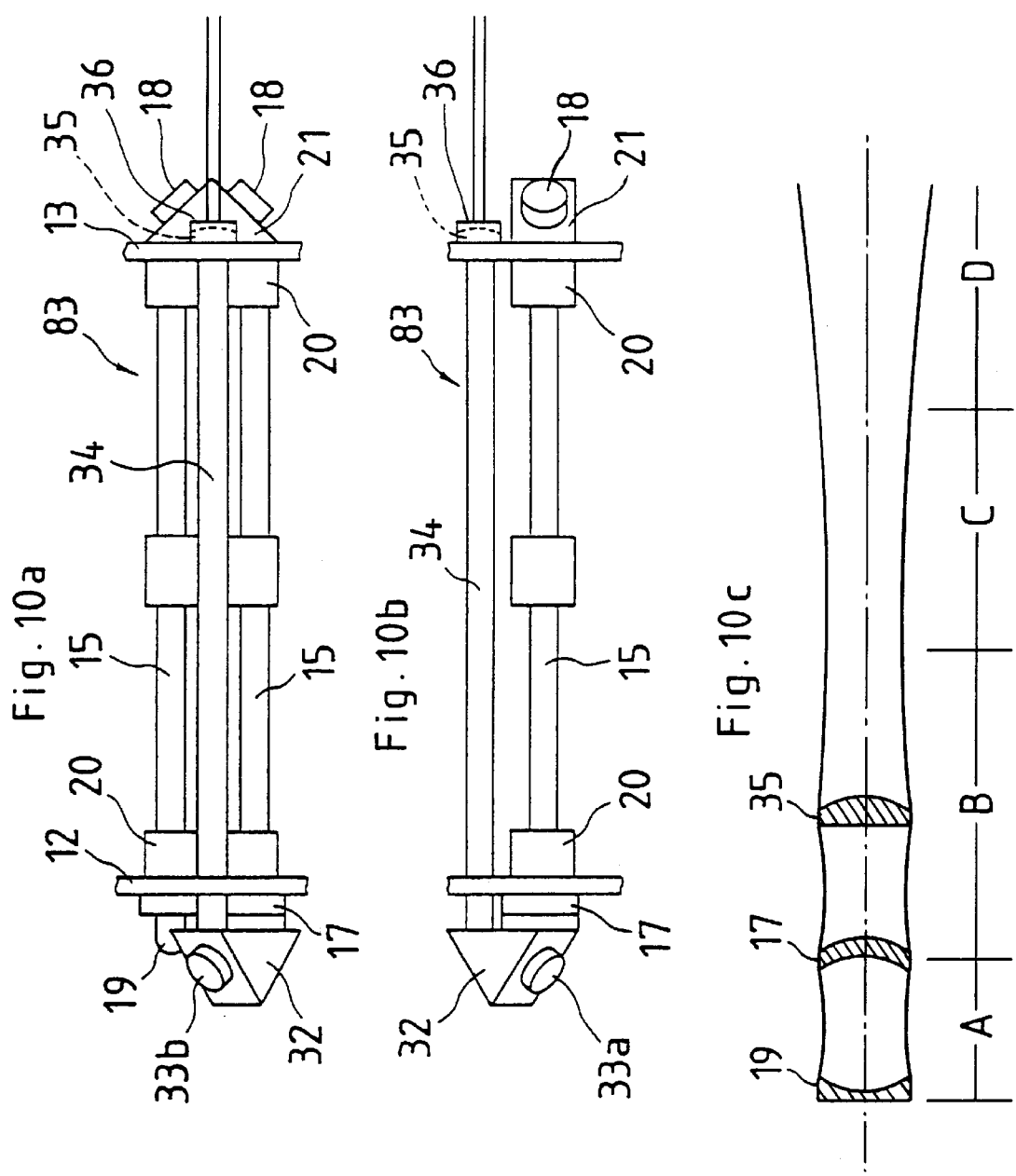

COMPACT LASER OSCILLATOR

This application is a continuation, of application Ser. No. 08/137,033, filed Oct. 18, 1993, now abandoned.

TECHNICAL FIELD

The present invention relates to a laser oscillator, and more particularly, to a laser oscillator used in a laser processing apparatus.

BACKGROUND ART

A laser processing apparatus has been widely used as one of machine tools for thermal treatment of metals and nonmetals, such as laser cutting, laser welding, etc. FIG. 1 shows an outline of a conventional laser processing apparatus. The laser processing apparatus 1 comprises a laser oscillator 90, a laser beam machine 3, and a numerical control device 4. A laser beam emitted from the laser oscillator 90 passes through a shading duct 5, and reaches a processing head 6 of the laser beam machine 3. The vertical position of the processing head 6, which has a condenser lens, is adjusted by means of a Z-axis movement mechanism (not shown) in response to a command from the numerical control device 4. The condenser lens of the processing head 6 converges the laser beam on a processing point of a workpiece 7, which is placed on an X-Y table of the laser beam machine 3, where the workpiece 7 is processed.

FIGS. 2a, 2b and 2c show an arrangement of a conventional laser resonator 80 which is provided in the laser oscillator 90. The laser resonator 80 is provided with a frame 9, a gas exciting device 10, and a gas cooling device 11. The frame 9, comprising front and rear aluminum plates 12 and 13 and four rods 14 which connect the front and rear plates 12 and 13, is constructed firmly lest it be easily deformable by external force. Each rod 14 is in the form of a tube made of a material such as invar in order to minimize a heat-induced dimensional change of the frame 9. While the laser resonator 80 is operating, cooling water is circulated in the rods 14. Thus, the frame 9 is designed so that its thermal deformation is extremely small.

The gas exciting device 10 comprises discharge tubes 15a and 15b arranged parallel to each other, electrodes 16a and 16b arranged on the respective peripheral walls of the discharge tubes 15a and 15b facing each other, and a high-frequency power source 16 connected to the electrodes 16a and 16b. The opposite ends of each of the two discharge tubes 15a and 15b are fixed to the front and rear plates 12 and 13 by means of discharge tube holders 20, respectively. The rear plate 13 is fitted with a turn-back block 21 having two reflectors 18 which are arranged at right angles to each other, whereby the discharge tubes 15a and 15b are connected to each other. The respective inside spaces of the discharge tubes 15a and 15b are coupled to each other by means of the block 21, thus forming one resonant space. An output mirror 17 is attached to one end of the discharge tube 15a which is situated near the front plate 12, and a rear mirror 19 is attached to one end of the discharge tube 15b which is situated near the front plate 12.

Electric power from the high-frequency power source 16 is applied to cause electric discharge between the electrodes 16a and 16b, whereby $CO_2$ gas in each of the discharge tubes 15a and 15b is excited. Laser emitted from the excited gas is amplified as it repeatedly reciprocates in the discharge tubes between the output mirror 17 and the rear mirror 19. Part of the laser constitutes a laser beam 22, which is emitted forward (to the left of FIG. 2) from the output mirror 17.

The gas cooling device 11 is composed of a Roots blower 23, heat exchangers 24 and 25 arranged on the intake and discharge sides of the Roots blower 23 respectively, and a pipe 26. When the Roots blower 23 is activated, the gas, adjusted in temperature by means of the heat exchangers 24 and 25, circulates in the pipe 26, whereby the gas in the discharge tubes 15a and 15b is cooled.

A shutter mirror 27 is used in suspending laser processing. When the shutter mirror 27 is in the optical path, as indicated by dotted line, the laser beam 22 is caused to deviate from the main optical path for processing, and is absorbed by a beam absorber 28. A beam phase adjusting unit 29 has a phase lag reflector 30 and a zero-shift reflector 31 therein. The beam phase adjusting unit 29 serves to convert a linear polarized laser beam into a circular polarized laser beam.

In general, the laser processing is effected by converging the laser beam outputted from the laser oscillator 80. In such a case, the distance between a laser beam outlet of the laser oscillator 80 and the processing point greatly influences the laser processing performance.

FIG. 5 schematically shows the discharge tubes 15 of the laser resonator and the laser beam 22. The laser beam 22, repeatedly reflected and amplified in a section A between the rear mirror 19 and the output mirror 17 on the discharge tubes 15 and emitted through the output mirror 17, has the property of spreading as the optical path length increases. The laser processing performance, which changes depending on various factors, is largely influenced by the diameter of the laser beam 22 at the position of the condenser lens, spread angle, and intensity distribution (transverse mode), in particular. Thus, the distance (optical path length) between the output mirror 17 of the laser resonator and the processing point of the laser beam machine 3 is an important factor as it restricts the laser processing performance.

For example, in the case of laser cutting, the spread angle of the laser beam 22 is narrow in a zone B; the transverse mode is a low-order multi-mode or ring mode, as indicated by (I) or (II); and satisfactory cutting cannot be achieved due to the influence of diffraction of light emitted from the edge portion of the output mirror 17. In a zone D, the diameter of the laser beam 22 is too large. In a zone C, on the other hand, the transverse mode resembles a single mode, as indicated by (III), and the spread of the laser beam 22 is appropriate and best suited for the laser cutting. According to the result of a cutting test using a $CO_2$ gas laser beam, the aforesaid zone C is situated within the range of 3 m to 6 m from the output mirror 17, and the distance between the output mirror 17 and the processing point obtained when the condenser lens is located within this range is an optimum optical path length.

Conventionally, in order to obtain the aforesaid optimum optical path length, a relatively long light guide distance $L_1$ is secured between the laser oscillator 20 and the laser beam machine 3, as shown in FIGS. 1 and 3. Such a long light guide distance $L_1$, however, places a limitation not only on the compactness of the arrangement of the laser processing apparatus 1 as the whole but also on the degree of freedom of design. Moreover, in a conventional arrangement, the beam phase adjusting unit 29 is externally attached in the manner as is shown in FIG. 3 where a circular polarized laser beam is needed at the processing point. In this arrangement, however, dust is liable to adhere to the reflectors in the unit, thereby lowering the laser processing performance.

DISCLOSURE OF THE INVENTION

The present invention provides a laser oscillator which allows the distance between a laser beam machine and the laser oscillator to be reduced.

A laser oscillator according to the present invention comprises a laser resonator for emitting a laser beam and turn-back means for reflecting and turning back the laser beam emitted from the laser resonator, the laser beam emitted from the laser resonator being outputted from the laser oscillator after being turned back by the turn-back means and traveling for a predetermined optical path length.

According to an aspect of the present invention, the turn-back means reverses the direction of the laser beam emitted from the laser resonator, and the laser beam emitted from the laser resonator is outputted from the laser resonator after traveling at least through an optical path of a length equivalent to the longitudinal length of the laser resonator.

The turn-back means may be formed of first and second reflectors arranged in the vicinity of an output mirror of the laser resonator and at right angles to each other, and the laser beam outputted from the output mirror is immediately reflected twice by the first and second reflectors. One of the first and second reflectors may be a phase lag reflector.

BRIEF DESCRIPTION OF THE DRAWINGS

FIGS. 2a, 2b and 2c are a plan view, front view, and side view, respectively showing an arrangement of a conventional laser resonator;

FIG. 5 is a diagram for illustrating a manner of emission of a laser beam;

FIGS. 6a, 6b and 6c are a plan view, front view, and side view, respectively showing an arrangement of a laser resonator according to a first embodiment of the present invention, and FIG. 6d is a diagram for illustrating an arrangement of discharge tubes;

FIGS. 7a, 7b and 7c are a plan view, front view, and side view, respectively showing an arrangement of a laser resonator according to a second embodiment of the present invention;

FIG. 8 is a diagram for illustrating the way the optical path is turned back according to the first embodiment shown in FIGS. 6a to 6d;

FIG. 9 is a diagram for illustrating the way the optical path is turned back according to the second embodiment shown in FIGS. 7a to 7c;

FIGS. 10a and 10b are a plan view and a front view, respectively showing a laser resonator according to a third embodiment of the present invention, and FIG. 10c is a diagram for illustrating a manner of emission of a laser beam.

BEST MODE OF CARRYING OUT THE INVENTION

Figure 1:
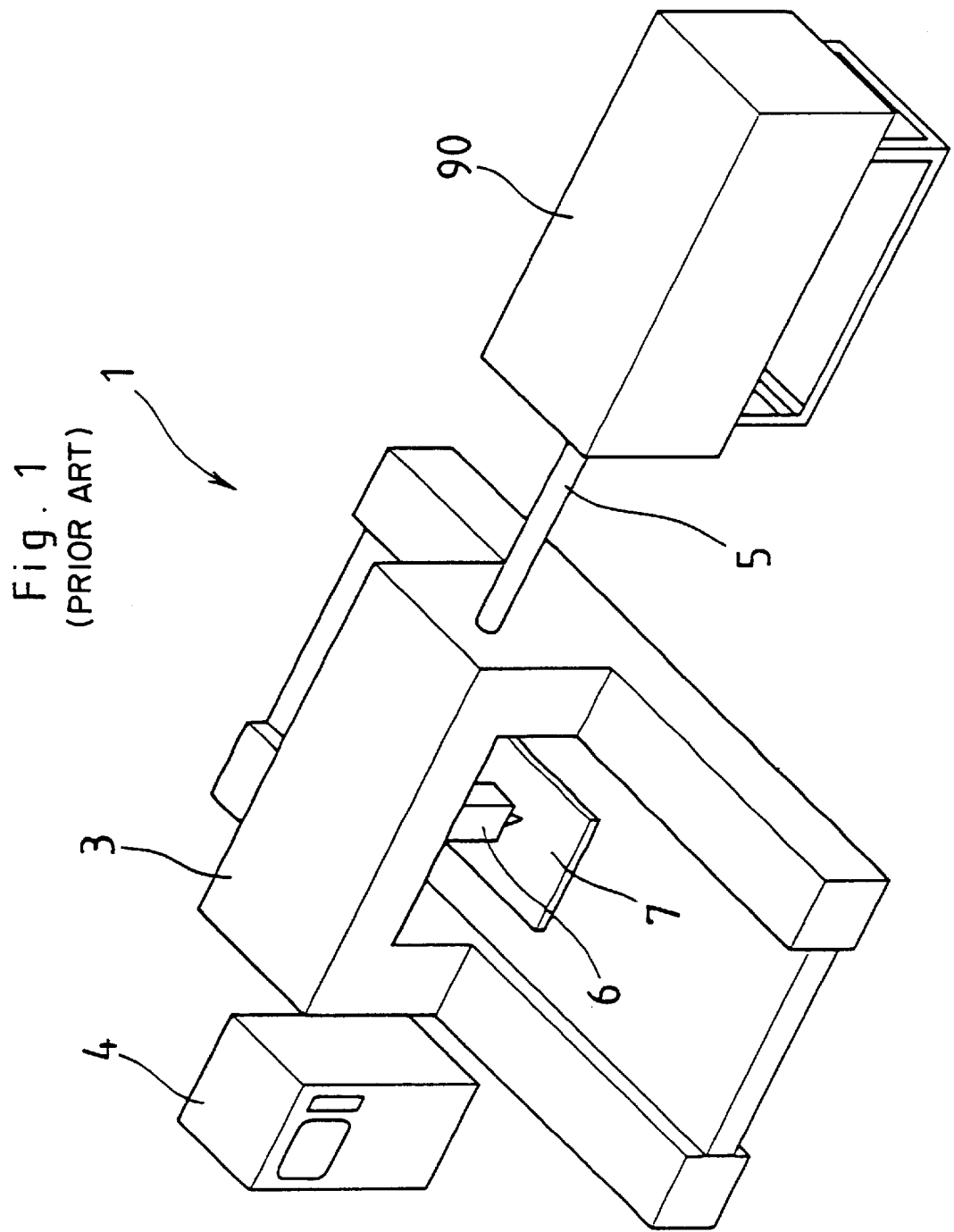
FIG. 1 is a perspective view showing a conventional laser processing apparatus.

FIGS. 6a, 6b, 6c and 6d show a laser resonator 81 of a laser oscillator according to a first embodiment of the present invention.

In FIGS. 6a, 6b, 6c and 6d, rods of a frame, a gas exciting device, and a gas cooling device are arranged in the same manner as the rods 14 of the frame 9 of the laser resonator 80, the gas exciting device 10, and the gas cooling device 11 which are respectively shown in FIG. 2, so that their illustration is omitted. Further, like reference numerals refer to those members which have the same or equivalent functions as the conventional ones shown in FIG. 2, so that a detailed descriptions of those members are omitted.

Like the prior art example shown in FIG. 2, a laser resonator 81 comprises two discharge tubes 15a and 15b arranged parallel to each other. The discharge tubes 15a and 15b are attached to front and rear plates 12 and 13 by means of discharge tube holders 20, individually. A turn-back block 21 having two reflectors 18, which are arranged at right angles to each other, is fixed to the rear face of the rear plate 13, whereby the discharge tubes 15a and 15b are connected to each other. An output mirror 17 is provided on one end of the discharge tube 15a, and a rear mirror 19 on one end of the discharge tube 15b.

First and second additional reflectors 33a and 33b are attached to the front plate 12 by means of an additional block 32. The additional reflectors 33a and 33b are mounted at right angles to each other on the additional block 32. The first additional reflector 33a reflects a laser beam 22, emitted from the output mirror 17, on the second additional reflector 33b, while the second additional reflector 33b reflects backwards the laser beam 22 from the first additional reflector 33a. Thereupon, the laser beam 22 emitted from the output mirror 17 diametrically changes its course. An additional shading duct 34 penetrates the front and rear plates 12 and 13, and is arranged parallel to the discharge tubes 15a and 15b. The front end of the additional shading duct 34 is located close to the second additional reflector 32b, and the rear end thereof opens backward.

When the laser resonator 81 is actuated, the laser beam is amplified as it repeatedly reciprocates in the discharge tubes 15a and 15b between the output mirror 17 and the rear mirror 19, and is emitted forward from the output mirror 17, as shown in FIG. 8. The emitted laser beam is immediately reflected twice and turned back by the additional reflectors 33a and 33b, which are arranged in the vicinity of the output mirror 17, and advances parallel to the discharge tubes 15a and 15b through a light guide path in the additional shading duct 34, thereby becoming the output of the laser oscillator. Thus, the laser beam emitted from the output mirror 17 advances through the laser resonator 81, and its traveling direction is opposite to the direction in which it is emitted from the output mirror 17.

Figure 4:
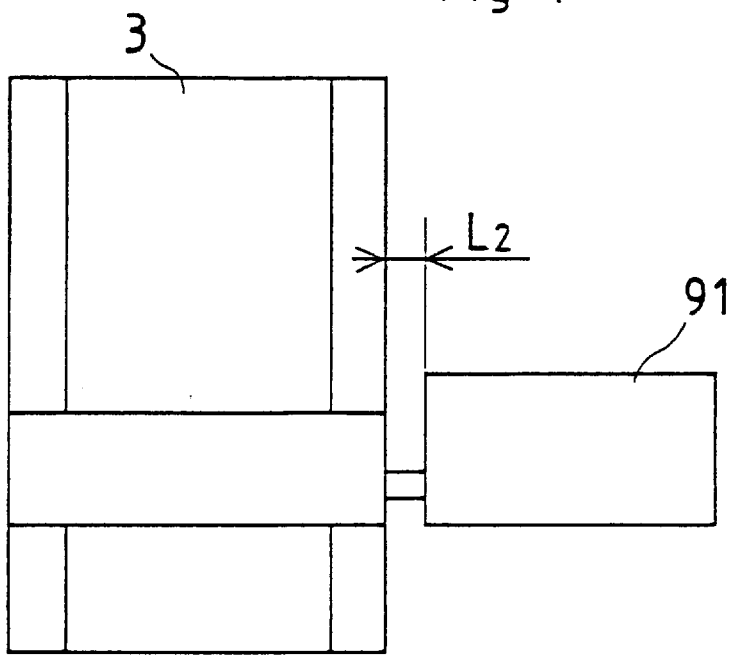
FIG. 4 is a plan view showing the positional relationship between a laser beam machine and a laser oscillator of a laser processing apparatus according to the present invention.

In the arrangement described above, the laser beam 22 outputted from the laser oscillator is already advanced at least for an optical path length which is equivalent to the longitudinal length of the laser resonator 81. Thus, when the laser oscillator 91 of the present embodiment is connected to the laser beam machine 3 in a manner such that an optimum optical path length can be obtained, as shown in FIG. 4, the light guide length (length of shading duct 5) $L_2$ between the oscillator and the machine is shortened by a length equivalent to the longitudinal length of the laser resonator 81, so that the laser processing apparatus can be made compact as the whole. Since the optical path length between the laser oscillator and the laser beam machine need not be made long, so that a higher degree of freedom can be enjoyed in designing the laser processing apparatus.

The laser beam 22 emitted from the output mirror 17 is turned back by the additional reflectors 33a and 33b, and advances for the distance between the front and rear plates 12 and 13 of the frame 19, which is designed for a minor thermal deformation, so that the resulting optical path length is very accurate.

Figure 3:
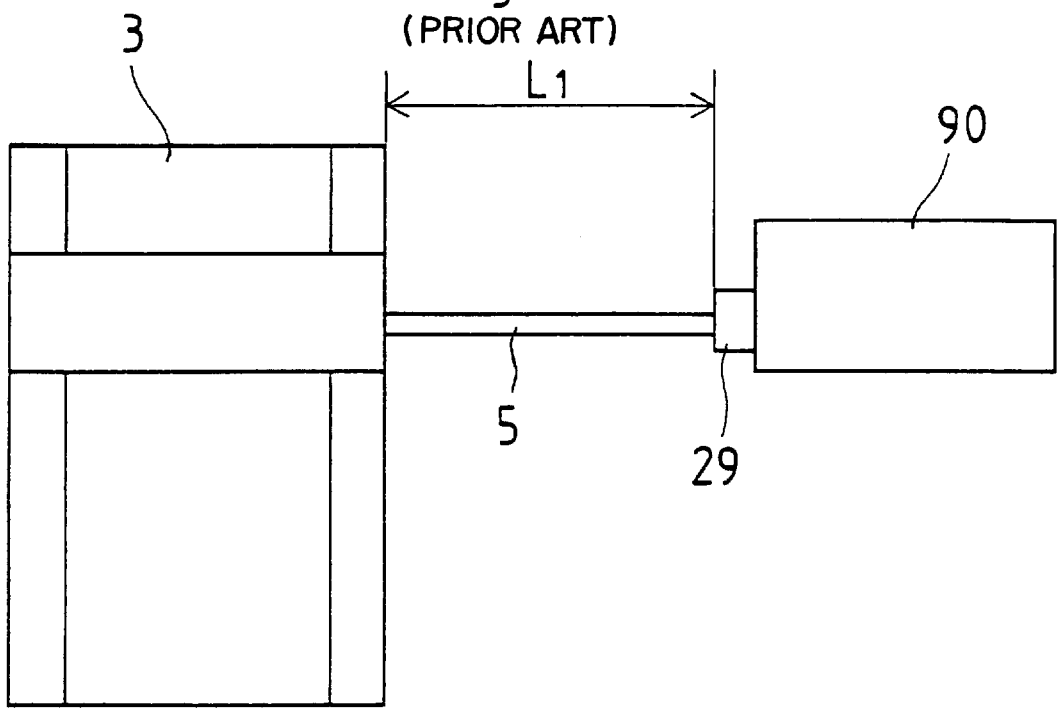
FIG. 3 is a plan view showing the positional relationship between a laser beam machine and a laser oscillator of the conventional laser processing apparatus.

If one of the additional reflectors 33a and 33b is formed of a phase lag reflector and the other of a zero-shift reflector, they constitute the beam phase adjusting unit 29 shown in FIG. 3. In this manner, the conventional beam phase adjusting unit 29 can be incorporated in the laser oscillator 91.

Thus, the circular polarized light can be obtained inside the laser oscillator, so that an external optical system of the laser processing apparatus, which is susceptible to contamination, can be simplified in construction.

Referring now to FIGS. 7a, 7b and 7c, a second embodiment of the present invention will be described. In a laser resonator 82 of the present embodiment, four discharge tubes 15a, 15b, 15c and 15d are fixed between front and rear plates 12 and 13 of a frame 9 so that the respective resonant spaces of the discharge tubes are doubled twice. In order to obtain this arrangement, the front plate 12 is fitted with one turn-back block 21 having two reflectors 18 which are arranged at right angles to each other, and the rear plate 13 with two.

An additional block 32, which is provided with additional reflectors 33a and 33b arranged at right angles to each other, is located in the vicinity of that turn-back block 21 which is attached to the front plate 12. A laser beam 22 emitted from an output mirror 17 of the discharge tube 15 is reflected and turned back by the first and second additional reflectors 33a and 33a. As in the case of the first embodiment, an additional shading duct 34 is disposed, between the front and rear plates 12 and 13, extending parallel to the discharge tubes 15a to 15d and longitudinally penetrating the center of the space in which the four discharge tubes 15a to 15d are arranged. The front end of the additional shading duct 34 faces the second additional reflector 33b, and rear end thereof opens backward at the position where it penetrates the rear plate 13.

When the laser resonator 82 is actuated, the laser beam, amplified as it repeatedly reciprocates in the discharge tubes 15a to 15d between a rear mirror 19 and the output mirror 17 while being turned back by the reflectors 18, is emitted from the output mirror 17. The emitted laser beam is immediately turned back by the first and second additional reflectors 33a and 33b, and is outputted backward through the additional shading duct 34. Therefore, in the case of the present embodiment too, the laser beam 22 outputted from a laser oscillator 2 advances for an optical path length which is equivalent to the longitudinal distance of the laser resonator 82 before it is emitted from the laser resonator 82. Thus, the optical path length between the laser oscillator 91 and a laser beam machine 3 can be shortened.

FIGS. 10a, 10b and 10c show a third embodiment of the present invention, which differs in that the rear plate 13 is provided with a long-focus lens 35.

The long-focus lens 35 is attached to an opening portion at the rear end of an additional shading duct 34 by means of a lens holder 36. Thus, a laser beam 22 emitted from the output mirror 17 is turned back by additional reflectors 33, then passes through the long-focus lens 35, and is outputted from a laser oscillator.

As shown in FIG. 10c, the long-focus lens 35 is used to adjust the spread angle of the outputted laser beam 22. By the use of this lens, the state of the laser beam 22 in the zone C shown in FIG. 5, e.g., the spread of the beam for a necessary depth of a focus at the processing point, can be kept in a desired state. In the present embodiment, the long-focus lens 35 is attached to a frame 9 which is dimensionally stable, so that the aforesaid function can be fulfilled more stably and accurately than in the case of external attachment.

In the foregoing embodiments, the laser beam 22 emitted from the output mirror 17 is immediately reflected twice to be outputted from the laser oscillator. Alternatively, however, the additional reflectors 33 may be increased in number so that the laser beam is outputted from the laser oscillator after undergoing at least another reflection. In this case, the distance between the laser oscillator and the laser beam machine can further be shortened. In this case, the direction of the laser beam 22 outputted from the laser oscillator sometimes coincides with the direction of the laser beam 22 emitted from the output mirror 17.

The additional shading duct 34 of the laser resonators 81, 81 and 83 may be omitted. In this case, the front and rear plates 12 and 13 are provided with coaxial through holes, individually, so that the laser beam 22 is outputted from the laser resonator through these through holes.

The additional block 32 may be located in a position separated from the frame 9. Preferably, however, the additional block 32 is fixed to the frame 9 by some means, in order to make accurate the optical path length obtained as the laser beam 22 emitted from the output mirror 17 is turned back.

What is claimed is:

1. A compact laser oscillator comprising:
   a laser resonator having at least one discharge tube forming a continuous resonant space therein and a partially transparent output mirror for emitting a laser beam from the laser resonator;
   a frame having front and rear plates and a structure for connecting said front and rear plates, for supporting said laser resonator; and
   turn-back means mounted on said frame for reflecting and turning back the laser beam emitted from said laser resonator such that the reflected laser beam is directed on a path substantially parallel to said resonator;
   wherein the laser beam is output from the laser oscillator after being reflected by said turn-back means and after traveling between the front and rear plates for a distance greater than or equal to the longitudinal length of the laser resonator.

2. A compact laser oscillator according to claim 1, wherein said laser resonator has an output mirror;
   said turn-back means is formed of first and second reflectors right angles to each other arranged in the vicinity of said output mirror; and
   the laser beam emitted from said output mirror is immediately reflected twice by said first and second additional reflectors.

3. A compact oscillator according to claim 1, wherein said laser resonator includes a plurality of discharge tubes arranged parallel to one another and coupled by means of reflectors so that a continuous resonant space is formed in the discharge tubes.

4. A compact laser oscillator according to claim 1, further comprising:
   a long-focus lens for adjusting the spread angle of the laser beam turned back by said turn-back means.

5. A compact laser oscillator according to claim 3, wherein the laser beam turned back by said turn-back means travels parallel to said plurality of discharge tubes in a space surrounded by said discharge tubes.

6. A compact oscillator comprising:
   a laser resonator having a partially transparent output mirror and at least one discharge tube forming a continuous resonant space therein for emitting a laser beam;

a frame having front and rear plates and a structure for connecting said front and rear plates, for supporting said laser resonator; and turn-back means mounted on said frame for reflecting and turning back the laser beam emitted from said laser resonator such that the reflected laser beam is directed on a path substantially parallel to said resonator; said turn-back means including a phase lag reflector, wherein the laser beam is output from the laser oscillator after being reflected by said turn-back means and after traveling an optical path length greater than or equal to the longitudinal length of the laser resonator.

7. A compact laser oscillator comprising:

a laser resonator having at least one discharge tube forming a continuous resonant space therein, and having a partially transparent output mirror for emitting a laser beam from the laser resonator;

a frame having front and rear plates, and a structure for connecting said front and rear plates, for supporting said laser resonator; and first and second reflectors mounted on the frame, the laser beam emitted by the output mirror being immediately reflected twice by said first and second reflectors to travel within said frame, in a direction opposite and substantially parallel to the direction of the emission from said output mirror, wherein the laser beam reflected by and output from said first and second reflectors is output from the laser oscillator after traveling between the front and rear plates for a distance greater than or equal to the longitudinal length of the laser resonator.

8. A compact laser oscillator according to claim 7, further comprising a long-focus lens for adjusting the spread angle of the laser beam reflected by said first and second reflectors.

9. A compact oscillator comprising:

a laser resonator having at least one discharge tube forming a continuous resonant space therein, and having a partially transparent output mirror from which a laser beam is emitted;

a frame having front and rear plates, and a structure for connecting said front and rear plates, for supporting said laser resonator; and first and second reflectors mounted on the frame, one of said first and second reflectors being a phase lag reflector the laser beam emitted by the output mirror being immediately reflected twice by said first and second reflectors to travel within said frame, in a direction opposite and substantially parallel to the direction of the emission from said output mirror, wherein the laser beam reflected by and output from said first and second reflectors is output from the laser oscillator after traveling an optical path length greater than or equal to the longitudinal length of tile laser resonator.

10. A compact laser oscillator comprising:

a frame having front and rear plates, the front and rear plates being separated by a longitudinal length;

a folded cavity laser resonator having at least one discharge tube extending between and supported by the front and rear plates, the folded cavity laser resonator forming a continuous resonant space therein and having a partially transparent output mirror for emitting a laser beam;

reflectors mounted on said frame to reflect the laser beam emitted from the folded cavity laser resonator such that after reflection, the laser beam is directed on an optical path between the front and rear plates and directed substantially parallel to said at least one discharge tube, the optical path having a length greater than or equal to the longitudinal length of the laser resonator.

11. A compact laser oscillator according to claim 10, further comprising a shading duct extending between the front and rear plates such that the optical path extends through the shading duct and the laser beam is shaded within the shading duct after being reflected by the reflectors.

* * * * *